United States Patent
Akinaga et al.

(10) Patent No.: US 6,348,165 B1
(45) Date of Patent: Feb. 19, 2002

(54) SEMICONDUCTOR MAGNETO-OPTICAL MATERIAL

(75) Inventors: Hiroyuki Akinaga, Tsukuba; Koichi Onodera, Sendai, both of (JP)

(73) Assignees: Agency of Industrial Science & Technology, Ministry of International Trade & Industry, Tokyo; Tokin Corporation, Sendai, both of (JP)

(*) Notice: Subject to any disclaimer, the term of this patent is extended or adjusted under 35 U.S.C. 154(b) by 0 days.

(21) Appl. No.: 09/556,405

(22) Filed: Apr. 24, 2000

Related U.S. Application Data

(62) Division of application No. 09/007,515, filed on Jan. 15, 1998, now Pat. No. 6,132,524.

(30) Foreign Application Priority Data

Jan. 16, 1997 (JP) .................................................. 9-5628

(51) Int. Cl.$^7$ ................................................ F21V 9/14
(52) U.S. Cl. ........................ 252/585; 252/584; 252/583; 359/280; 359/281
(58) Field of Search .................................. 252/585, 584, 252/583; 359/280, 281

(56) References Cited

U.S. PATENT DOCUMENTS

| | | | |
|---|---|---|---|
| 4,921,763 A | | 5/1990 | Karamon ..................... 428/692 |
| 5,657,151 A | * | 8/1997 | Swan ......................... 359/281 |
| 5,790,299 A | * | 8/1998 | Wilson et al. ............... 359/281 |

OTHER PUBLICATIONS

J. De Boeck, et al. "Nanometer–scale magnetic MnAs particles in GaAs grown by molecular beam epitaxy" Appl. Phys. Lett., vol. 68, No. 19, pp. 2744–2746, May 6, 1995.

* cited by examiner

*Primary Examiner*—Philip Tucker
(74) *Attorney, Agent, or Firm*—Oblon, Spivak, McClelland, Maier & Neustadt, P.C.

(57) ABSTRACT

A semiconductor magneto-optical material includes a semiconductor dispersed with fine magnetic material particles and is characterized by exibiting magneto-optical optical effect at ordinary room temperature.

2 Claims, 1 Drawing Sheet

SEMICONDUCTOR MAGNETO-OPTICAL MATERIAL

This application is a division of application Ser. No. 09/007,515 filed Jan. 15, 1998, now U.S. Pat. No. 6,132,524.

BACKGROUND OF THE INVENTION

1. Field of the Invention

This invention relates to a semiconductor magneto-optical material whose magneto-optical effect can be utilized to enable optical communication, signal processing and data recording by laser beam or the like.

2. Description of the Prior Art

Recent advances in next-generation optical communication technology and next-generation large-capacity data storage technology, together with ever expanding networks offering commercial connection services and the like via the Internet, are combining to set the stage for a full-blown multimedia age that is rapidly approaching.

The core technologies required for next-generation optical communications are:
1. Ultrahigh speed/ultra-long distance transmission technology
2. Optical coherent communication technology
3. Optical signal processing technology
4. Optical component and integrated circuit technology.

Of recent technological breakthroughs, one of the most significant in connection with items 1–4 is the erblum-doped fiber amplifier (EDFA). Owing to its larger repercussion effect, the EDFA has dramatically increased transmission distance.

A laser diode (LD) module is used as the excitation light source and the signal light source of the EDFA. When a laser module is used, however, light reflected by, for example, the end face of the optical fiber connected with the laser module and the connection points between optical fibers reenters the LD. The operation characteristics are therefore markedly degraded by the occurrence of retrogressive light noise, output fluctuation, and other factors. The practice is therefore to block the retrogressive light reflected toward the LD by use of an optical isolator so as to overcome the operational instability of the LD module owing to reflected retrogressive light.

An optical isolator is an optical component (optical non-reciprocal circuit) using a magneto-optical material exhibiting magneto-optical Faraday effect. In the field of optical communication, optical isolators have been developed for various wavelengths, including the 0.8 $\mu$m band (the wavelength of the most inexpensive GaAs semiconductor laser), the 1.3 $\mu$m–1.5 $\mu$m band (the band of lowest optical fiber transmission loss) and the 0.98 $\mu$m band (used for high-efficiency EDFA excitation).

Except in the 0.98 $\mu$m band, the typical magneto-optical material used is bismuth-substituted garnet.

Since the optical absorption of bismuth-substituted garnet is large in the 0.98 $\mu$m band, however, another magneto-optical material has been sought. This led to the recent development of a practical bulk isolator using a magnetic semiconductor based on cadmium telluride, a II–VI group semiconductor.

On the other hand, the optical isolator continues to account for a major portion of optical amplifier size and cost. In view of plans to connect individual homes with optical communication networks for introduction of bidirectional interactive services, multimedia communication services and the like, a strong need is felt for a smaller, low-cost optical isolator and for an optical waveguide-type optical isolator in the form of a thin film on the surface of a substrate. It will be immeasurable if this need should be met.

When a magnetic semiconductor based on cadmium telluride is used as the magneto-optical material of the optical isolator, the magneto-optical material must have a thickness of around 1,400 $\mu$m in order to secure a 45-degree rotation angle of the polarization surface. This makes it difficult to achieve small size and low cost.

An attempt to fabricate an optical isolator as an optical waveguide-type optical isolator encounters considerable difficulty in realizing the optical waveguide since bismuth-substituted garnet and cadmium telluride are poorly compatible with the GaAs semiconductor of the substrate.

An optical switching element utilizing the magneto-optical effect is also desired, not only for use in optical isolators but also for realizing optical integrated circuits, optical computers and the like. A magneto-optical material that can overcome the foregoing problems is therefore also sought for this purpose.

This invention was accomplished in light of the foregoing circumstances and has as its object to provide a semiconductor magneto-optical material that exhibits pronounced magneto-optical effect in a desired wavelength region and can be formed as a thin film.

SUMMARY OF THE INVENTION

To achieve this object, the invention provides a semiconductor magneto-optical material comprising a semiconductor dispersed with fine magnetic material particles, which is characterized by exhibiting magneto-optical effect at ordinary room temperature.

Since the energy gap of the semiconductor constituting the matrix can be freely changed, the semiconductor magneto-optical material can be adapted to any desired wavelength region.

The magnitude of the magneto-optical effect (Faraday effect) can be represented in terms of the thickness of the medium that rotates the polarization surface of the light by 45 degrees. The thickness of the semiconductor magneto-optical material of this invention required to rotate the polarization surface of light of 0.98 $\mu$m wavelength by 45 degrees is 300 $\mu$m, about one-fifth that required in the case of the currently used magnetic semiconductor based on cadmium telluride. Since the material can therefore exhibit the required properties even as a thin film, it is capable of reducing size and lowering cost.

The above and other features of the present invention will become apparent from the following description made with reference to the drawings.

DESCRIPTION OF THE PREFERRED EMBODIMENTS

The inventors discovered that dispersion of fine magnetic material particles in a semiconductor results in a semiconductor magneto-optical material exhibiting a large magneto-optical effect in freely selectable wavelength region at room temperature. This invention was accomplished on the basis of this discovery.

The semiconductor of the matrix can be any IV group semiconductor such as Si, III–V group semiconductor, of which GaAs is typical, or the like enabling dispersion of fine magnetic material particles. Since the energy gap of the semiconductor can be changed as desired, the semiconductor magneto-optical material can be adapted to any wavelength region.

Fine magnetic material particles usable in the invention include those of such magnetic elements as Fe, Co and Ni and those of such magnetic compounds as MnAs, MnGa, MnSb and MnAl. Magnetic properties of the fine magnetic material particles such as magnetic transition temperature and saturation magnetic field can be controlled by mixing two or more types of particles and/or by appropriately adding thereto one or more of the elements Al, Si, Ti, V, Cr, Cu Zn, Zr, Nb, Mo, To, Ru, Rh, Pd, Ag, Cd, In, Sn, Te, Hf, Ta, W, Re, Os, Ir, Pt, Au, Hg, Tl, Pb and Bi.

Methods usable for dispersing the fine magnetic material particles in the semiconductor include the molecular beam epitaxy method, such simultaneous vapor deposition methods as the vapor phase growth method, sputtering method and laser ablation method, and methods combining any of these with heat, laser beam or electron beam treatment. Any method capable of forming fine magnetic material particles in the semiconductor suffices.

An embodiment of the invention will now be explained in detail with reference to the drawings.

This embodiment relates to fabrication of a MnAs:GaAs semiconductor magneto-optical material specimen and measurement of the magneto-optical effect exhibited by the specimen.

Figure 1:
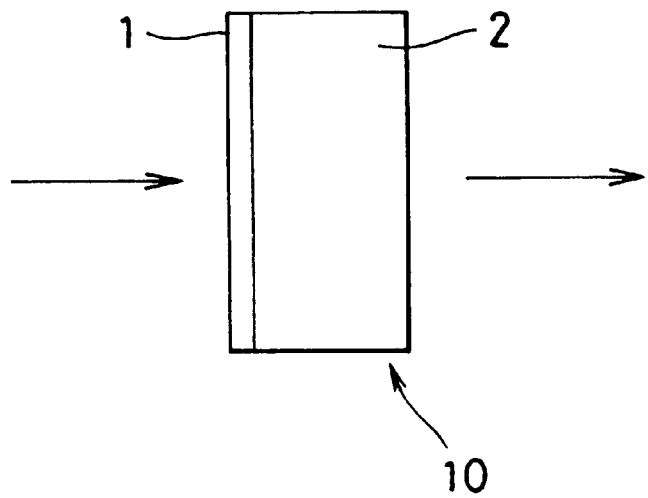
FIG. 1 is a sectional view showing an example of the structure of a specimen of the semiconductor magneto-optical material according to the invention.

FIG. 1 is a sectional view showing an example of the structure of the MnAs:GaAs semiconductor magneto-optical material specimen. The thin film 1 in FIG. 1 is composed of a semiconductor magneto-optical material according to the invention and in this embodiment is a film of MnAs:GaAs. Specifically, the thin film 1 was formed to a thickness of about 100 nm by molecular beam epitaxy conducted at 220° C. to uniformly disperse fine particles of MnAs, a magnetic material, in the GaAs, a semiconductor material, on a GaAs semiconductor substrate 2. The result was annealed at about 580° C. for about 10 min. to obtain a specimen 10 in FIG. 2. The Mn concentration of the thin film 1 was about 4% relative to the Ga concentration. The particle diameter of the MnAs in the thin film was approximately 10 nm.

GaAs was selected as the material for both the matrix semiconductor of the semiconductor magneto-optical material and the substrate thereof. This was to show that the magneto-optical material can be easily integrated with GaAs semiconductor, which is the semiconductor currently most often used for laser fabrication in optical communication technologies.

Measurement of the magneto-optical effect of the thin film 1 was performed using the GaAs semiconductor substrate 2 and the thin film 1 as the specimen 10, with a laser beam (indicated by the arrow in FIG. 1) directed perpendicular to the specimen 10.

Figure 2:
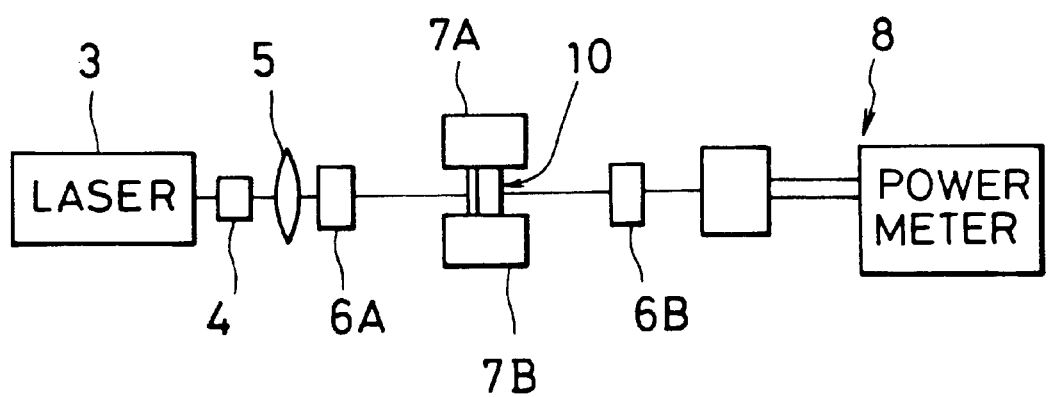
FIG. 2 is a schematic view of a measurement system for measuring the magneto-optical effect of the semiconductor magneto-optical material according to the invention.

FIG. 2 is a schematic view of a measurement system for measuring the magneto-optical effect of the semiconductor magneto-optical material (thin film 1) according to the invention. The measurement system comprises a pair of samarium-cobalt magnets 7A, 7B, Glan-Thompson prisms 6A, 6B disposed on opposite sides of the samarium-cobalt magnets 7A, 7B, and a power meter 8 disposed as the final stage. The specimen 10 is disposed in the magnetic field between the samarium-cobalt magnets 7A, 7B. A semiconductor laser 3 outputting a laser beam of 0.98 μm wavelength is used as the light source. During measurement, the laser beam from the semiconductor laser 3 is directed into the Glan-Thompson prism 6A constituting the first stage of the measurement system through an optical isolator 4 and a lens 5. The measurement was effected at room temperature.

In the measurement system of the foregoing configuration, the laser beam exiting the Glan-Thompson prism 6A impinges perpendicularly on the specimen 10 and has its polarization surface rotated by a prescribed angle owing to the Faraday effect of the thin film 1. The rotation angle is measured by the Glan-Thompson prism 6B and the power meter 8. The measurement system is configured with application of the invention semiconductor magneto-optical material to optical isolators in mind because a particularly urgent need is currently felt for the development of high-performance optical isolators for high-efficiency EDFA excitation.

The results of the performance evaluation by the measurement system described above are shown in the following table.

|  | Thickness required for 45-degree rotation | Quenching ratio |
| --- | --- | --- |
| Invention (MnAs:GaAs) | 300 μm (at 0.98 μm) | 38 dB |
| CdMnHgTe | 1,400 μm (at 0.98 μm) | 30 dB |
| Bismuth-substituted garnet | 250 μm (at 1.3 μm) | >30 dB |

The magnitude of the magneto-optical effect (Faraday effect) is indicated in terms of the thickness of the medium (material) required to rotate the polarization surface of the light 45 degrees. (In the actual optical isolator the element thickness is adjusted to rotate the polarization surface by 45 degrees.)

The Faraday rotation angle θF indicating the Faraday effect is generally represented by the equation:

θF [degree]=V [degree/Oe/μm]×5000 [Oe]×Material thickness [μm], where V is Verdet's constant, a coefficient representing Faraday rotation magnitude, and 5000 Oe is the strength of the magnetic field applied by the magnets 7A, 7B.

It can be seen from this equation that the thickness of the material required to rotate the polarization surface of the light by 45 degrees is inversely proportional to the value of Verdet's constant V. The thickness of the semiconductor magneto-optical material can therefore be made thinner in proportion as Verdet's constant V is larger.

As shown in the table above, the thickness of the material required to rotate the polarization surface of the light of 0.98 μm wavelength by 45 degrees is 300 μm for the MnAs:GaAs of the invention in comparison with 1,400 μm (1.4 mm) for CdMnHgTe, the magnetic semiconductor based on cadmium telluride currently in practical use. In other words, the invention achieves about 4.6 times the performance of the magnetic semiconductor based on cadmium telluride. As further shown by way of comparison, this performance is on substantially the same order as that of the practically applied bismuth-substituted garnet at a wavelength of 1.3 μm.

Since the semiconductor magneto-optical material of the invention has a very large Verdet's constant, it reduces the required material thickness and, as such, can reduce the size of magneto-optical elements and be used in the form of thin film. Since the material is semiconductor based, moreover, it has good compatibility with a semiconductor substrate and can therefore be easily formed on a semiconductor substrate as a thin film. It therefore also enables ready realization of an optical waveguide-type optical isolator.

A condition for the application of the material to an actual element. is that its quenching ratio be not less than 30 dB when the crossed-nichol condition defined by the equation below is satisfied. Since the performance evaluation showed it to have a quenching ratio of 38 dB, the semiconductor magneto-optical material according to the invention composition system clearly achieves a level of performance on this point adequate for practical application.

Quenching ratio=(Crossed-nichol optical transmittance)/(Parallel nichol optical transmittance)

Moreover, it was ascertained that the rotation angle magnitude and magnetic field sensitivity of the material can be controlled by varying the size of the fine magnetic material particles and that the material does not experience change with aging. The semiconductor magneto-optical material according to the invention is thus free of any problem hindering its application as a magneto-optical material.

Since the MnAs:GaAs material of this embodiment exhibits large magneto-optical effect even at room temperature, it achieves superior performance even as a thin film and can therefore contribute to size and cost reduction.

The foregoing explanation focuses on the Faraday effect of the semiconductor magneto-optical material according to the invention since this is the most important property from the point of application to an optical isolator. However, the material also exhibits other magneto-optical effects, such as Cotton-Mouton effect and magnetic Kerr effect, of similar magnitude.

Although GaAs was used as the semiconductor for the matrix in the embodiment described, any semiconductor can be used insofar as it enables dispersion of the fine magnetic material particles, including, for example, Si and other IV group semiconductors and III–V group semiconductors other than GaAs. Since the energy gap of a semiconductor can be changed as desired, the semiconductor magneto-optical material can be adapted to any wavelength region.

Although particles of MnAs, a magnetic compound, were used as the fine magnetic material particles, other fine magnetic material particles are also usable, including particles of magnetic elements such as Fe, Co and Ni and particles of magnetic compounds such as MnGa, MnSb and MnAl. Further, magnetic properties of the fine magnetic material particles such as magnetic transition temperature and saturation magnetic field can be controlled by mixing two or more types of particles and/or by appropriately adding thereto one or more of the elements Al, Si, Ti, V, Cr, Cu Zn, Zr, Nb, Mo, Tc, Ru, Rh, Pd, Ag, Cd, In, Sn, Te, Hf, Ta, W, Re, Os, Ir, Pt, Au, Hg, Tl, Pb and Bi.

Methods usable for dispersing the fine magnetic material particles in the semiconductor include not only the molecular beam epitaxy method employed in the embodiment but also such simultaneous vapor deposition methods as the vapor phase growth method, sputtering method and laser ablation method, and methods combining any of these with heat, laser beam or electron beam treatment. Any method capable of forming fine magnetic material particles in the semiconductor suffices.

The semiconductor magneto-optical material according to the invention can be readily used to fabricate more compact, less expensive, higher performance elements by use of conventional semiconductor technologies. Since the material is semiconductor based, moreover, it enables fabrication of an integrated device including both a semiconductor laser and a waveguide-type optical isolator, realization of thin film optical switches in semiconductor optical integrated circuits, and size and cost reduction of such devices and elements.

As will be understood from the foregoing explanation, the invention makes it possible to fabricate a semiconductor magneto-optical material exhibiting large magneto-optical effect by dispersing fine magnetic material particles in a semiconductor.

In accordance with the invention, a semiconductor magneto-optical material exhibiting large magneto-optical effect in any desired wavelength region even at room temperature can be obtained by appropriate selection of the semiconductor of the matrix. The materials according to the invention can therefore be used in place of all of the various magneto-optical materials corresponding to different wavelength regions employed in currently used optical isolators. Since the invention materials exhibit large magneto-optical effect, moreover, they can fulfill their functions even in the form of thin films. The invention therefore makes a significant contribution to size and cost reduction.

What is claimed is:

1. A method of switching the polarization of light penetrating a semiconductor magneto-optical material, comprising:

irradiating the semiconductor magneto-optical material with a light in the presence of a magnetic field;

wherein said semiconductor magneto-optical material comprises a semiconductor having dispersed therein fine magnetic compound particles selected from the group consisting of MnAs, MnGa, MnSb and MnAl.

2. The method of claim 1, wherein said semiconductor is a group IV semiconductor or a group III–V semiconductor.

* * * * *